United States Patent Office 3,079,398
Patented Feb. 26, 1963

3,079,398
PROCESS FOR PREPARING LEUCO SULFURIC ACID ESTERS OF VAT DYESTUFFS
Otto Fuchs and Fritz Meininger, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 26, 1960, Ser. No. 45,269
Claims priority, application Germany Aug. 8, 1959
13 Claims. (Cl. 260—316)

It is known that leuco sulfuric acid esters of vat dyestuffs can be prepared in various ways by having a metal and a sulfatizing agent act upon the basic vat dyestuff. In the known processes, there is esterified either the leuco compound of the basic vat dyestuff which is already existing or that which is formed at the moment of the reaction. The selection of an appropriate sulfatizing agent consisting of a compound capable of accumulating sulfur trioxide, and sulfur trioxide, or of a compound yielding sulfur trioxide such as, for example, chlorosulfonic acid or chlorosulfonic acid methyl ester is in any case an important requirement for a successful reaction.

On account of the great technical importance of the leuco sulfuric acid esters of vat dyestuffs, there have, furthermore, been proposed many processes for preparing these esters wherein the selection of the appropriate compound capable of accumulating sulfur trioxide is of particular importance. The most interesting property of compounds capable of accumulating sulfuric acid trioxide is indeed their ability to form salt-like addition compounds with sulfur trioxide. However, a series of further properties is necessary for the practical application of these compounds in the preparation of sulfuric acid esters of vat dyestuffs. Thus, the compound capable of accumulating sulfur trioxide shall at the same time be a solvent for its addition compound with sulfur trioxide, the leuco compound of the vat dyestuff and the leuco sulfuric acid ester. Furthermore, the compound shall be applicable to all classes of vat dyestuffs and practically yield a neutral reaction with regard to certain vat dyestuffs which can be esterified only with difficulty. Still further, it is necessary that the compound is substantially stable in an aqueous alkaline medium so that it can be substantially recovered when the leuco sulfuric acid ester is worked up. Finally, the said compound shall be capable of being readily removed and regenerated from aqueous alkaline salt solutions by distillation under reduced pressure, or extraction with organic solvents. Among the great number of such compounds which are already known, the pyridine and homologues of pyridine hold a special position in so far as they are particularly suitable for the preparation of leuco sulfuric acid esters of vat dyestuffs. It is known, however, that pyridine and its homologues cannot be used when certain vat dyestuffs are concerned which can be esterified only with difficulty.

Further compounds which are capable of accumulating sulfur trioxide and suitable for the preparation of leuco sulfuric acid esters of vat dyestuffs are organic carbamides wherein the hydrogen atoms bound to the nitrogen atom are replaced by alkyl groups such as, for example, dimethylformamide (cf. German Patent 810,053, U.S. Patent 2,604,477) or the N-methylacetamide (cf. U.S. patent appln. S.N. 761,287 filed September 16, 1958) now U.S. Patent 3,006,923.

Now we have found that leuco sulfuric acid esters of vat dyestuffs can be prepared, more advantageously than in the presence of pyridine bases or N-alkyl-carbamides known for this purpose, by reacting the leuco compound of the vat dyestuff or a metal salt of the leuco compound or a complex compound of the leuco compound in the presence of a phosphoric acid-tris-dialkylamide corresponding to the following general formula

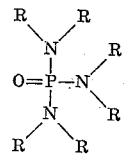

wherein R represents lower straight-chained or branched, equal or different alkyl groups, if desired in the presence of inert organic diluents, with sulfur trioxide or a compound yielding sulfur trioxide at a temperature ranging from about 10° C. to 60° C., preferably from about 30° C. to 50° C. As phosphoric acid-tris-dialkylamides corresponding to the above general formula there may be used, for example, phosphoric acid-tris-dimethylamide, phosphoric acid-tris-diethylamide, phosphoric acid-tris-dipropylamide and phosphoric acid-tris-dibutylamide. Mixtures of phosphoric acid-tris-dialkylamides corresponding to the aforesaid formula may also be used.

As compared with the known esterification process in pyridine bases, the use of phosphoric acid-tris-dialkylamides offers the advantage that there cannot only be obtained the leuco sulfuric acid esters of vat dyestuffs which can be prepared according to known processes but also such as cannot be prepared by those known processes with the use of pyridine. In comparison with the N-alkylcarbamides, phosphoric acid-tris-dialkylamides offer the advantage that they are much more stable in an alkaline medium and that they are not saponified under the conditions used during the esterification of vat dyestuffs. It is known that carbamides in which the hydrogen atoms at the nitrogen atom are replaced by alkyl radicals, such, for example, as dimethylformamide, can be saponified without difficulty in an alkaline medium. In other words, those carbamides which can only difficultly be removed by distillation under reduced pressure, are decomposed when the leuco sulfuric acid esters of vat dyestuffs are worked up in an alkaline medium.

During this process there are lost, for example, up to 50% of the dimethylformamide used. It is also known that the complete saponification of N-dimethylformamide is intentionally effected by the addition of alkalies (cf. British Patent 749,607). From these statements follows that under the said circumstances N-alkylamides cannot be regenerated or with great losses only.

The use of phosphoric acid-tris-dialkylamides instead of N-alkylcarbamides involves the special advantage that phosphoric acid-tris-dialkylamides are on the one hand surprisingly resistant to aqueous alkalies and, on the other hand, can more readily be extracted with organic solvents from aqueous solutions containing the leuco sulfuric acid ester of the basic vat dyestuff. The affinity of the phosphoric acid tris-dialkylamide for passing over from the aqueous phase into the organic phase is in this case substantially greater than with N-alkylcarbamides which fact is demonstrated by the concentrations measured in the equilibrium of distribution and the distribution coefficient (cf. the following table).

| Distribution coefficient of— | chloroform/water | methylene chloride/water | ethylene chloride/water |
|---|---|---|---|
| dimethyl formamide | 0.77 | 0.57 | 0.29 |
| N-methyl acetamide | 0.099 | 0.088 | 0.039 |
| phosphoric acid tris-dimethyl amide | 5.53 | 2.07 | 0.58 |

If follows from the table that for example phosphoric acid-tris-dimethylamide possesses a distribution coefficient for the pair of phases chloroform/water that is seven times greater than that of dimethylformamide. In the case of the pair of phases ethylene chloride/water, the value of the distribution coefficient is even about 15 times greater than with N-methyl-acetamide.

The esterification can be carried out in the absence or presence of inert organic diluents such, for example, as acetone, methylene chloride, chloroform, ethylene chloride, benzene or chlorobenzene. If desired, there may also be used mixtures of the diluents specified above by way of example. After completion of the reaction, the mixture obtained is introduced into a dilute sodium carbonate solution, filtered off and then extracted with an organic solvent such as, for example, ethylene chloride, chloroform or methylene chloride in order to separate the phosphoric acid tris-dialkylamide used from the obtained aqueous solution of the leuco sulfuric acid ester.

Suitable metal salts of leuco compounds of vat dyestuffs, which can be esterified according to the process of the present invention, are, for example, the alkali, iron, copper or zinc salts. The reduction of the vat dyestuffs to the leuco compounds used as starting compounds in the process of the present invention is suitably carried out in a manner such that the vat dyestuff is reduced with zinc and anhydrous acetic acid at a temperature ranging from about 20° C. to 80° C., preferably from about 30° C. to 50° C., if desired in the presence of a diluent such as, for example, methylene chloride or ethylene chloride. The zinc salt of the leuco compound of the reduced vat dyestuff thus formed can then be subjected to esterification without intermediate isolation. Depending upon the vat dyestuff to be reduced, it may be of advantage to reduce the vat dyestuff to the leuco compound in the presence of a phosphoric acid-tris-dialkylamide corresponding to the general formula indicated above. When, for example, the vat dyestuff is reduced with zinc and glacial acetic acid in the presence of a phosphoric acid-tris-dialkylamide, complex compounds may form which consist probably of the leuco compounds formed, the phosphoric acid-tris-dialkylamide used and zinc ions. It is suitable to further treat the complex compounds thus obtained to leuco sulfuric acid esters without intermediate isolation. Further complex compounds of leuco vat dyestuffs which may be used as starting compounds are, for example, the complex compounds formed of iron or copper salts of the leuco compounds and tertiary organic amines such, for example, as pyridine or α-picoline.

The process of the present invention is distinguished by a wide range of application and covers also the preparation of leuco sulfuric acid esters of vat dyestuffs which can be esterified only with difficulty. By vat dyestuffs which are difficult to esterify there are to be understood compounds which form leuco compounds other than the normal ones under the usual conditions during esterification in pyridine.

Vat dyestuffs which can be esterified only with difficulty are also those the normal leuco compounds of which shown strong tendencies of transposition into the corresponding keto or oxanthrone forms (cf. Melliands Textilberichte, 28 (1948), pages 93, 136 and 273). As such vat dyestuffs there may be mentioned, for example, anthrimides, anthrimide carbazoles such as 1,1',5,1"-trianthrimide-2,2',6,2"-carbazole, various acylamino-anthraquinones, such as 1,4-dibenzoylamino-anthraquinone or 1,5-dibenzoyl-4,8-dihydroxyanthraquinone.

The dyeings and prints obtained by the usual methods of application with the use of the leuco sulfuric acid esters obtainable according to the invention are particularly distinguished by their purity of tint and very good properties of fastness.

The following examples serve to illustrate the invention, but they are not intended to limit it thereto, the parts being by weight.

*Example 1*

6 parts of zinc dust and 7 parts of anhydrous acetic acid are introduced into a suspension of 5 parts of finely divided dimenthoxy-dibenzanthrone in 50 parts of phosphoric acid-tris-dimethylamide, and the mixture is then stirred for 1 hour at 40° C. The reaction mixture is then cooled to 30° C. and introduced into a sulfatizing mixture of 50 parts of ethylene chloride, 40 parts of phosphoric acid-tris-dimethylamide and 10 parts of sulfur trioxide. The whole is stirred for 30 minutes at 30° C. and the mixture is poured into a sodium carbonate solution of 15% strength in excess. The ethylene chloride is then distilled off under reduced pressure and the solution of the leuco sulfuric acid ester is separated by filtration from insoluble constituents. The phosphoric acid-tris-dimethylamide contained in the dyestuff solution is then extracted by means of chloroform. The product is salted out by the addition of potassium chloride, filtered off and stabilized with 0.5 part of sodium carbonate, 0.5 part of urea and 0.8 part of molasses and dried at 40° C. to 50° C. under reduced pressure. Instead of the phosphoric acid-tris-dimethylamide there may also be used phosphoric acid-tris-dibutylamide, and instead of the sulfur trioxide there may be used chlorosulfonic acid.

Instead of ethylene chloride, the sulfatizing mixture may also contain acetone, benzene or chlorobenzene.

*Example 2*

8 parts of anhydrous acetic acid and subsequently 7 parts of zinc dust are introduced into a mixture of 10 parts of 1, 1', 5, 1"-trianthrimide-2,2',6,2"-carbazole, 50 parts of ethylene chloride and 20 parts of phosphoric acid-tris-dimethylamide. The reaction mixture is stirred for 3 hours at 40° C. under a nitrogen atmosphere until the reduction is complete. The mixture is then cooled to 30° C. and introduced, while cooling, into a sulfatizing mixture which has been prepared at 20° C. from 30 parts of phosphoric acid-tris-dimethylamide, 40 parts of ethylene chloride and 25 parts of sulfur trioxide. The whole is stirred for 30 minutes at 40° C., introduced into an excess of a sodium carbonate solution and distilled under reduced pressure. The zinc residue is filtered off and the leuco sulfuric acid ester is salted out in the form of a yellow precipitate by the addition of potassium chloride.

*Example 3*

20 parts of the dyestuff obtainable by condensing 1,4,5,8-tetrachloroanthraquinone with 1-amino-anthraquinone and carbazole ring closure (cf. German Patent 262,788) are introduced into a mixture of 110 parts of ethylene chloride, 40 parts of phosphoric acid-tris-dimethylamide, 16 parts of glacial acetic acid and 14 parts of zinc dust and the whole is stirred for 6 hours at 45° C. After the reduction is complete, the mixture is introduced into a sulfatizing mixture of 80 parts of phosphoric acid-tris-dimethylamide, 70 parts of ethylene chloride and 46 parts of sulfur trioxide. The whole is esterified for 30 minutes at 40° C., poured into an excess of a sodium carbonate solution of 15% strength and distilled at 30° C. under reduced pressure. The solution which contains the leuco sulfuric acid ester in a quantative yield is filtered and then extracted with methylene chloride. The product is isolated as described in Example 1.

*Example 4*

20 parts of leuco-2,9-dibromo-dibenzpyrene-quinone or the sodium salt of this leuco compound, which are suspended in a mixture of 100 parts of ethylene chloride and 50 parts of phosphoric acid-tris-dimethylamide, are introduced into a sulfatizing mixture of 70 parts of ethylene chloride, 70 parts of phosphoric acid-tris-dimethylamide and 50 parts of sulfur trioxide or chlorosulfonic acid methyl ester. The whole is stirred for 30 minutes at 40° C. and the reaction mixture is introduced into a dilute sodium carbonate solution in excess. The dyestuff solution is freed from ethylene chloride by distillation under reduced pressure, filtered off, and finally salted out with sodium chloride.

Instead of ethylene chloride as the diluent there may also be used chloroform with the same result.

Example 5

90 parts of methylene chloride, 10 parts of 1,5-dibenzoylaminoanthraquinone, 7 parts of zinc dust and 8 parts of anhydrous acetic acid are stirred for 4 hours at 40° C. Into the greenish yellow suspension there is introduced at 30° C. a mixture of 50 parts of methylene chloride, 60 parts of phosphoric acid-tris-dimethylamide and 30 parts of sulfur trioxide, and the whole is stirred for a further 20 minutes at 45° C. The product is isolated as described in Example 1.

Example 6

8 parts of anhydrous acetic acid are introduced into a mixture of 10 parts of 3-chloro-2-acetamino-anthraquinone, 125 parts of ethylene chloride and 7 parts of zinc dust. After stirring for 4 hours at 40° C., the reduction to the leuco compound is complete. A sulfatizing mixture of 50 parts of ethylene chloride, 52 parts of phosphoric acid-tris-dimethylamide and 25 parts of sulfur trioxide is then added to the leuco compound and the whole is esterified for 15 minutes at 40° C.

The reaction mixture is then introduced into an excess of a sodium carbonate solution of 15% strength, distilled at 30° C. under reduced pressure and then filtered off. The filtrate contains the leuco sulfuric acid ester of 3-chloro-2-acetamino-anthraquinone in a very good yield and can be used for further reactions without isolating the leuco ester.

Example 7

15 parts of glacial acetic acid are added to 19 parts of finely divided 5,5'-dichloro-7,7'-dimethylthioindigo, 12 parts of zinc dust and 70 parts of ethylene chloride and the whole is stirred at 40° C. in a reaction vessel in which the air is replaced by nitrogen. The mixture is maintained for 4 hours at this temperature and then cooled to 30° C. A solution of 40 parts of sulfur trioxide in 80 parts of ethylene chloride and 52 parts of phosphoric acid-tris-dimethylamide is then added to this mixture and the whole is stirred for 1 hour at 40° C. In order to isolate the product, the mixture is introduced into a solution of sodium carbonate in water, distilled under reduced pressure and then filtered off. The filtrate is extracted with methylene chloride and sodium chloride is then added. The filtered product is stabilized with 2 parts of sodium carbonate and 2 parts of molasses and dried.

Example 8

A suspension of 10 parts of leuco-terephthal-5,5'-dibenzoylamino-1,1-anthraquinoylamide and 30 parts of phosphoric acid-tris-diethylamide in 85 parts of ethylene chloride is introduced into a mixture of 50 parts of ethylene chloride, 40 parts of phosphoric acid-tris-diethylamide and 25 parts of sulfur trioxide. The reaction mixture is stirred for 30 minutes at 35° C. and then introduced into a sodium carbonate solution in excess. The dyestuff is isolated as described in Example 1.

Example 9

85 parts of ethylene chloride, 10 parts of finely divided 1,1'-dianthrimide-2,2'-carbazole, 25 parts of phosphoric acid-tris-dimethylamide, 8 parts of glacial acetic acid and 7 parts of zinc dust are stirred for 4 hours at 40° C. under nitrogen.

The mixture is then cooled to 30° C. and mixed, while cooling, with a solution of 25 parts of sulfur trioxide in 30 parts of phosphoric acid-tris-dimethylamide and 40 parts of ethylene chloride. The mixture is stirred for 40 minutes at 30° C., introduced into a sodium carbonate solution in excess and distilled under reduced pressure. The zinc residue is filtered off and the filtrate is worked up as specified in Example 1.

Example 10

20 parts of anhydrous acetic acid are introduced into a mixture of 25 parts of finely divided 4,5'-dibenzoylamino-1,1'-dianthrimide-carbazole, 225 parts of ethylene chloride and 17.5 parts of zinc dust. The reaction mixture is stirred for 6 hours at 40° C. and then cooled to 0° C. 125 parts of phosphoric acid-tris-dimethylamide and subsequently 62.5 parts of sulfur trioxide are introduced within about 2 hours at a temperature ranging from about 0° C. to 10° C., while cooling. After the addition of sulfur trioxide, the whole is after-stirred for 1 hour at 0° C. to 10° C. and then poured into a solution of 142 parts of sodium carbonate in 800 parts of water. The mixture is distilled under reduced pressure and then filtered off. The solution of the leuco sulfuric acid ester is freed from phosphoric acid-tris-dimethylamide by extraction with methylene chloride or ethylene chloride and then salted out with potassium chloride.

We claim:

1. A process for preparing leuco sulfuric acid esters of vat dyestuffs of the anthraquinone and thioindigo series, which comprises esterifying a member selected from the group consisting of the leuco compound, the metal salt of the leuco compound, and the complex compound of the leuco compound of a vat dyestuff of said series at a temperature in the range from about 10° C. to 60° C. with a compound selected from the group consisting of sulfur trioxide, chlorosulfonic acid and chlorosulfonic acid methyl ester in the presence of a phosphoric acid-tris-dialkylamide of the formula $$O=P\begin{matrix}N(R)_2\\N(R)_2\\N(R)_2\end{matrix}$$

wherein the symbols R represent lower alkyl groups.

2. The process as claimed in claim 1, wherein the esterification is carried out at a temperature in the range from about 30° C. to 50° C.

3. The process as claimed in claim 1, wherein the lower alkyl groups for R are straight-chained.

4. The process as claimed in claim 1, wherein the lower alkyl groups for R are branched.

5. The process as claimed in claim 1, wherein the lower alkyl groups for R are equal.

6. The process as claimed in claim 1, wherein the lower alkyl groups for R are different.

7. The process as claimed in claim 1, wherein a member selected from the group consisting of phosphoric acid-tris-dimethylamide, phosphoric acid-tris-diethylamide, phosphoric acid-tris-dipropylamide and phosphoric acid-tris-dibutylamide is used as a phosphoric acid-tris-dialkylamide.

8. The process for preparing leuco sulfuric acid esters of vat dyestuffs of the anthraquinone and thioindigo series, which comprises esterifying a member selected from the group consisting of the leuco compound, the metal salt of the leuco compound and the complex compound of the leuco compound of a vat dyestuff of said series at a temperature from about 10° C. to 60° C. with a compound selected from the group consisting of sulfur trioxide, chlorosulfonic acid and chlorosulfonic acid methyl ester in the presence of a phosphoric acid-tris-dialkylamide of the formula $$O=P\begin{matrix}N(R)_2\\N(R)_2\\N(R)_2\end{matrix}$$

wherein the symbols R represent lower alkyl groups, and in the presence of an inert organic diluent.

9. The process as claimed in claim 8, wherein a member selected from the group consisting of acetone, methylene chloride, chloroform, ethylene chloride, benzene or chlorobenzene is used as inert organic diluent.

10. The process as claimed in claim 1, wherein a salt selected from the group consisting of sodium salt, iron salt, copper salt and zinc salt of the leuco compound is used as a metal salt of the leuco compound of a vat dyestuff of said series.

11. The process as claimed in claim 1, wherein a complex compound consisting of the iron salt of the leuco compound of a vat dyestuff and an organic tertiary amine is used as a complex compound of the leuco compound of a vat dyestuff of said series.

12. The process as claimed in claim 1, wherein a complex compound consisting of the copper salt of the leuco compound of a vat dyestuff and an organic tertiary amine is used as a complex compound of the leuco compound of a vat dyestuff of said series.

13. The process as claimed in claim 1, wherein the phosphoric acid-tris-dialkylamide used is separated from the obtained aqueous solution of the leuco sulfuric acid ester by extracting the reaction mixture with an organic solvent.

No references cited.